(12) United States Patent
Allgyer

(10) Patent No.: US 11,719,442 B2
(45) Date of Patent: Aug. 8, 2023

(54) COOKING PLATE FOR FIRE PIT

(71) Applicant: Breeo, LLC, Kinzers, PA (US)

(72) Inventor: Amos Alan Allgyer, Gordonville, PA (US)

(73) Assignee: Breeo, LLC, Kinzers, PA (US)

(*) Notice: Subject to any disclaimer, the term of this patent is extended or adjusted under 35 U.S.C. 154(b) by 0 days.

(21) Appl. No.: 17/832,603

(22) Filed: Jun. 4, 2022

(65) Prior Publication Data
US 2023/0043482 A1 Feb. 9, 2023

Related U.S. Application Data

(60) Provisional application No. 63/230,592, filed on Aug. 6, 2021.

(51) Int. Cl.
*F24B 1/00* (2006.01)
*A47J 33/00* (2006.01)
(Continued)

(52) U.S. Cl.
CPC ............... *F24B 1/003* (2013.01); *A47J 33/00* (2013.01); *F24B 1/182* (2013.01); *A47J 37/07* (2013.01); *A47J 37/0763* (2013.01)

(58) Field of Classification Search
CPC .......... F24B 1/003; F24B 1/182; F24B 1/193; F24B 1/26; A47J 33/00; A47J 37/07; A47J 37/0763; A47J 37/0781; A47J 37/067

(Continued)

(56) References Cited

U.S. PATENT DOCUMENTS 549,503 A * 11/1895 Dom ..................... A47J 37/10
D7/354
577,896 A * 3/1897 Walker ................ A47J 33/00
126/258

(Continued)

FOREIGN PATENT DOCUMENTS

AU 2016102123 A 1/2017
DE 3242656 A1 * 11/1982 .............. A47J 37/07

(Continued)

OTHER PUBLICATIONS

How to Use the Searplate Griddle, by Breeo, YouTube [online], published Mar. 23, 2022, [retrieved on Aug. 31, 2022]. Retrieved from the Internet, URL: https://www.youtube.com/watch?v=ErmtmvG8f2s&t=6s.

(Continued)

*Primary Examiner* — Steven B McAllister
*Assistant Examiner* — Daniel E. Namay
(74) *Attorney, Agent, or Firm* — Fred Zollinger

(57) ABSTRACT

A cooking plate is mountable to and removable from a fire pit. The cooking plate includes support tabs that position the cooking plate above the upper rim of the fire pit to provide even heating to the cooking plate while securing it in place with respect to the fire pit. The cooking plate can be placed on the fire pit after the fire has been started and removed while the fire is burning. The cooking plate has support tabs that each has an angled surface to allow the cooking plate to be leveled with respect to the fire pit. The cooking plate is ring-shaped and provides a central opening for the flame of the fire pit. The cooking plate defines an indentation that accommodates an accessory post of the fire pit.

19 Claims, 17 Drawing Sheets

(51) Int. Cl.
*F24B 1/182* (2006.01)
*A47J 37/07* (2006.01)

(58) Field of Classification Search
USPC .......... 126/27, 26, 9, 6, 29, 30, 218; 99/422, 99/447, 450
See application file for complete search history.

(56) References Cited

U.S. PATENT DOCUMENTS

| | | | |
|---|---|---|---|
| 931,533 A * | 8/1909 | Warner | B65D 7/20 |
| | | | 220/628 |
| 989,657 A * | 4/1911 | Southwick | F24C 1/16 |
| | | | 126/258 |
| 1,181,578 A * | 5/1916 | di Primio | F24C 5/20 |
| | | | 126/43 |
| 1,342,001 A | 6/1920 | Schulte | |
| 2,135,782 A * | 11/1938 | Mcbirney | A21B 3/155 |
| | | | 209/403 |
| 2,179,512 A * | 11/1939 | Mcbirney | A21B 3/155 |
| | | | 99/450 |
| 2,272,379 A | 8/1940 | Loukota et al. | |
| 2,413,204 A * | 12/1946 | Wolff | F24B 1/003 |
| | | | 99/425 |
| 3,381,678 A | 5/1968 | Fry | |
| 4,024,851 A * | 5/1977 | Boda | A47J 37/0763 |
| | | | 126/30 |
| D262,427 S | 12/1981 | Boston et al. | |
| 4,491,235 A * | 1/1985 | Fournier | A47J 27/002 |
| | | | 99/422 |
| 4,495,861 A * | 1/1985 | Jacks | A47J 37/0786 |
| | | | 99/422 |
| 4,508,094 A * | 4/1985 | Hait | F24B 1/205 |
| | | | 126/9 B |
| 4,805,526 A * | 2/1989 | Riva | A21B 3/15 |
| | | | 99/422 |
| 5,413,087 A | 5/1995 | Jean | |
| D374,796 S | 10/1996 | Bradley et al. | |
| D378,973 S | 4/1997 | Bradley et al. | |
| D389,009 S | 1/1998 | Baykal | |
| D394,779 S | 6/1998 | Hilvitz | |
| D399,932 S | 10/1998 | Heathcote | |
| 6,234,812 B1 | 5/2001 | Ivers et al. | |
| 6,386,498 B1 * | 5/2002 | Deco | A47J 36/027 |
| | | | 219/755 |
| D514,431 S | 2/2006 | Tanaka et al. | |
| 7,219,663 B2 | 5/2007 | Cuomo | |
| 7,275,278 B1 | 10/2007 | Martin et al. | |
| D557,982 S | 12/2007 | Ablo | |
| 7,344,173 B2 | 3/2008 | Gonzalez et al. | |
| D579,708 S | 11/2008 | Chen | |
| D581,844 S | 12/2008 | Ohigashi et al. | |
| D590,201 S | 4/2009 | Zagar | |
| 7,841,334 B1 * | 11/2010 | DePaul | F24B 3/00 |
| | | | 126/25 R |
| D635,816 S | 4/2011 | France et al. | |
| D695,059 S | 12/2013 | Mehler et al. | |
| D727,793 S | 4/2015 | Schier | |
| D734,436 S | 7/2015 | Raether | |
| D737,628 S | 9/2015 | Stone | |
| D742,490 S | 11/2015 | Jepson | |
| D751,238 S | 3/2016 | Siuvatti | |
| 9,474,414 B2 | 10/2016 | Yuen | |
| D774,630 S | 12/2016 | Mehari | |
| D776,519 S | 1/2017 | Mmaghlouth | |
| D777,307 S | 1/2017 | Rocha | |
| D791,394 S | 7/2017 | Rashidi Doust | |
| D791,395 S | 7/2017 | Rashidi Doust | |
| D798,099 S | 9/2017 | Goossens | |
| D799,935 S | 10/2017 | Rashidi Doust | |
| D830,095 S | 10/2018 | Goossens | |
| D833,347 S | 11/2018 | Lewis | |
| D838,164 S | 1/2019 | Hanchett et al. | |
| D847,228 S | 4/2019 | Wang | |
| D868,230 S | 11/2019 | Nitschmann | |
| D884,458 S | 5/2020 | Moore | |
| 10,674,852 B2 * | 6/2020 | Gauss | A47J 36/08 |
| 10,786,114 B2 | 9/2020 | Salum | |
| 10,888,195 B1 * | 1/2021 | Norris | A47J 37/0694 |
| 11,058,255 B2 | 7/2021 | Seong | |
| D938,805 S | 12/2021 | Thaler | |
| 11,278,153 B2 | 3/2022 | Stollzfus | |
| D960,348 S | 8/2022 | Stollzfus et al. | |
| 2002/0083846 A1 * | 7/2002 | Creighton | A47J 37/10 |
| | | | 99/422 |
| 2004/0016349 A1 * | 1/2004 | Robertson | A47J 37/0763 |
| | | | 99/449 |
| 2005/0051157 A1 * | 3/2005 | Cuomo | A47J 36/36 |
| | | | 126/275 R |
| 2008/0283031 A1 * | 11/2008 | Korab | A47J 33/00 |
| | | | 126/30 |
| 2009/0173238 A1 * | 7/2009 | Martinez | A47J 33/00 |
| | | | 99/352 |
| 2009/0205626 A1 * | 8/2009 | Ferreiro Cerceda | A47J 33/00 |
| | | | 126/299 R |
| 2014/0208961 A1 * | 7/2014 | Poon | A47J 37/0763 |
| | | | 99/446 |
| 2014/0261379 A1 * | 9/2014 | Mehler | A47J 33/00 |
| | | | 126/25 R |
| 2014/0360385 A1 * | 12/2014 | Cammon | A47J 37/0704 |
| | | | 29/401.1 |
| 2015/0068512 A1 | 3/2015 | Mehler et al. | |
| 2017/0181579 A1 | 6/2017 | Zeybek | |
| 2017/0273503 A1 * | 9/2017 | Schuitemaker | F24C 1/16 |
| 2017/0332840 A1 | 11/2017 | Schuitemaker | |
| 2021/0282588 A1 | 9/2021 | Moon et al. | |

FOREIGN PATENT DOCUMENTS

| | | | | |
|---|---|---|---|---|
| DE | 3621100 A1 * | 6/1986 | | A47J 37/07 |
| DE | 3928730 A1 * | 8/1989 | | F24C 15/18 |
| DE | 20310796 | 9/2003 | | |
| DE | 20310796 U | 9/2003 | | |
| KR | 20100004159 U * | 10/2008 | | A47J 37/0786 |
| KR | 20130113139 A * | 4/2012 | | A47J 37/067 |

OTHER PUBLICATIONS

BREEO X Series 30 Smokeless Fire Pit review, by C.L.S. All-in-One, YouTube [online], published Jun. 7, 2022, [retrieved on Aug. 31, 2022], Retrieved from the Internet, URL: https://www.youtube.com/watch?v=qnXZJ6qPd50.
Esschert Design, EsschertDesign BBQ Grill Griddle Fire Pit Center Disc, reviewed Jul. 18, 2020; accessed May 24, 2022 from https://www.pinterest.com/pin/esschertdesign-bbq-grill-griddle-fire-pit-center-disc-48061921343423442/.
Will Sabel Courtney, How Well Does This Unusual Backyard Fire Pit Work for Car Camping? We Found Out, Jul. 3, 2020.
Breeo, LLC, Instagram, Apr. 4, 2022, accessed May 4, 2022 from https://www.instagram.com/p/Cb78UAMFM5X/.
Breeo, LLC, Instagram, Mar. 22, 2022, accessed May 4 2022 from https://www.instagram.com/p/Cbaa6OyOcdg/.
Breeo, LLC, Instagram, Mar. 21, 2022, accessed May 4, 2022 from https://www.instagram.com/p/CbXy3dLInCT/.
Breeo, LLC, Breeo.co,, accessed May 4, 2022 from https://breeo.co/products/searplate-griddle.
Breeo, LLC, Instagram, Mar. 18, 2022, accessed Jun. 4, 2022 from https://www.instagram.com/tv/CbQGwaulPCe/?utm_source=ig_web_copy_link.

* cited by examiner

COOKING PLATE FOR FIRE PIT

CROSS REFERENCE TO RELATED APPLICATIONS

This application claims the benefit of U.S. Provisional Patent Application No. 63/230,592 filed 6 Aug. 2021; the disclosures of which are incorporated herein by reference.

BACKGROUND OF THE DISCLOSURE

1. Technical Field

The disclosure relates to fire pits and cooking implements for fire pits. Particularly, the disclosure relates to a removable, ring-shaped cooking plate that can be removably placed on a fire pit to provide an evenly-heated surface for cooking.

2. Background Information

Those who enjoy backyard fire pits have found that some are particularly useful for preparing food. Some fire pits include grills disposed over the fire box. Some can be fitted with kettle hooks and still some are provided with integrated cooking surfaces. There are some who would like to add cooking implements to their existing fire pits.

SUMMARY OF THE DISCLOSURE

The disclosure provides a cooking plate that is mountable to and removable from a fire pit. The cooking plate includes support tabs that position the cooking plate above the upper rim of the fire pit to provide even heating to the cooking plate while securing it in place with respect to the fire pit. The cooking plate can be placed on the fire pit after the fire has been started and removed while the fire is burning.

The disclosure provides a cooking plate configuration with support tabs that have angled surfaces to allow the cooking plate to be leveled.

The disclosure provides a configuration wherein the cooking plate is ring-shaped and provides a central opening for the flame of the fire pit.

The disclosure provides a cooking plate with an uninterrupted ring-shaped cooking surface.

The disclosure provides a cooking plate that is made from quarter inch thick carbon steel.

The disclosure provides a configuration wherein the cooking plate includes handles that allows a user to lift the cooking plate away from the fire plate when the cooking is complete and the user wishes to enjoy the fire pit without the cooking plate. The handles are connected to the bottom surface of the cooking plate so that they do not interfere with the cooking surface. The handles are also configured to be spaced from the body of the fire pit when the cooking plate is in use so that the handles stay cool enough to use after the cooking plate is used.

The disclosure provides a configuration of a cooking plate that accommodates an accessory post. The disclosure provides a configuration of a cooking plate that accommodates two accessory posts.

The individual features described below may be combined in different combinations than specifically described below to form different configurations of the device of the disclosure. Other than where specified, the locations of the specific items can be changed about the circumference of the plate. The preceding non-limiting aspects of the disclosure, as well as others, are more particularly described below. A more complete understanding of the devices, assemblies, and methods can be obtained by reference to the accompanying drawings, which are not intended to indicate relative size and dimensions of the assemblies. In those drawings and the description below, like numeric designations refer to components of like function. Specific terms used in that description are intended to refer only to the particular structure of the embodiments selected for illustration in the drawings, and are not intended to define or limit the scope of the disclosure.

DETAILED DESCRIPTION OF THE DISCLOSURE

Figure 1:
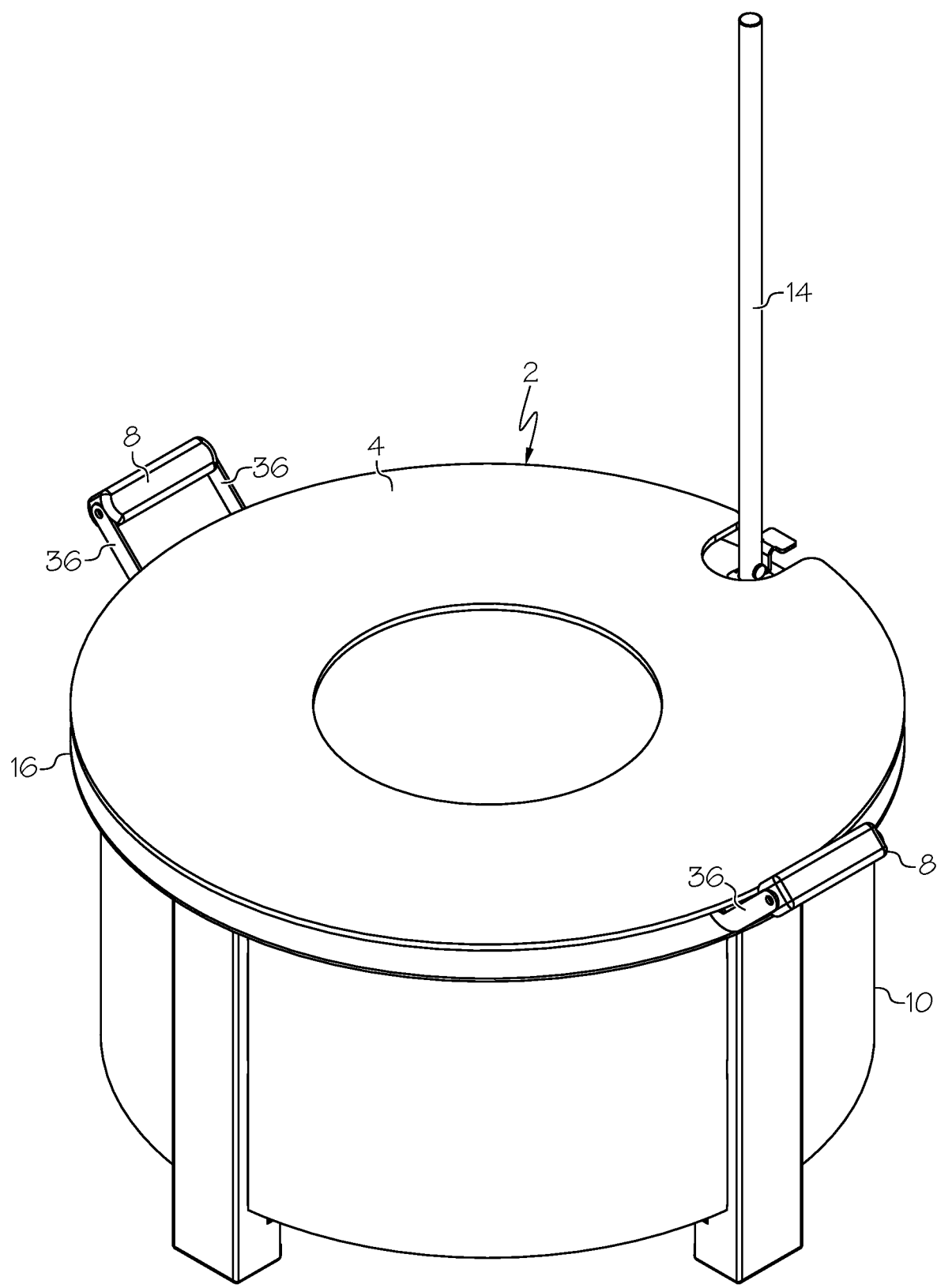
FIG. 1 is a perspective view of a first configuration of a cooking plate connected to a fire pit having an accessory post.
Figure 2:
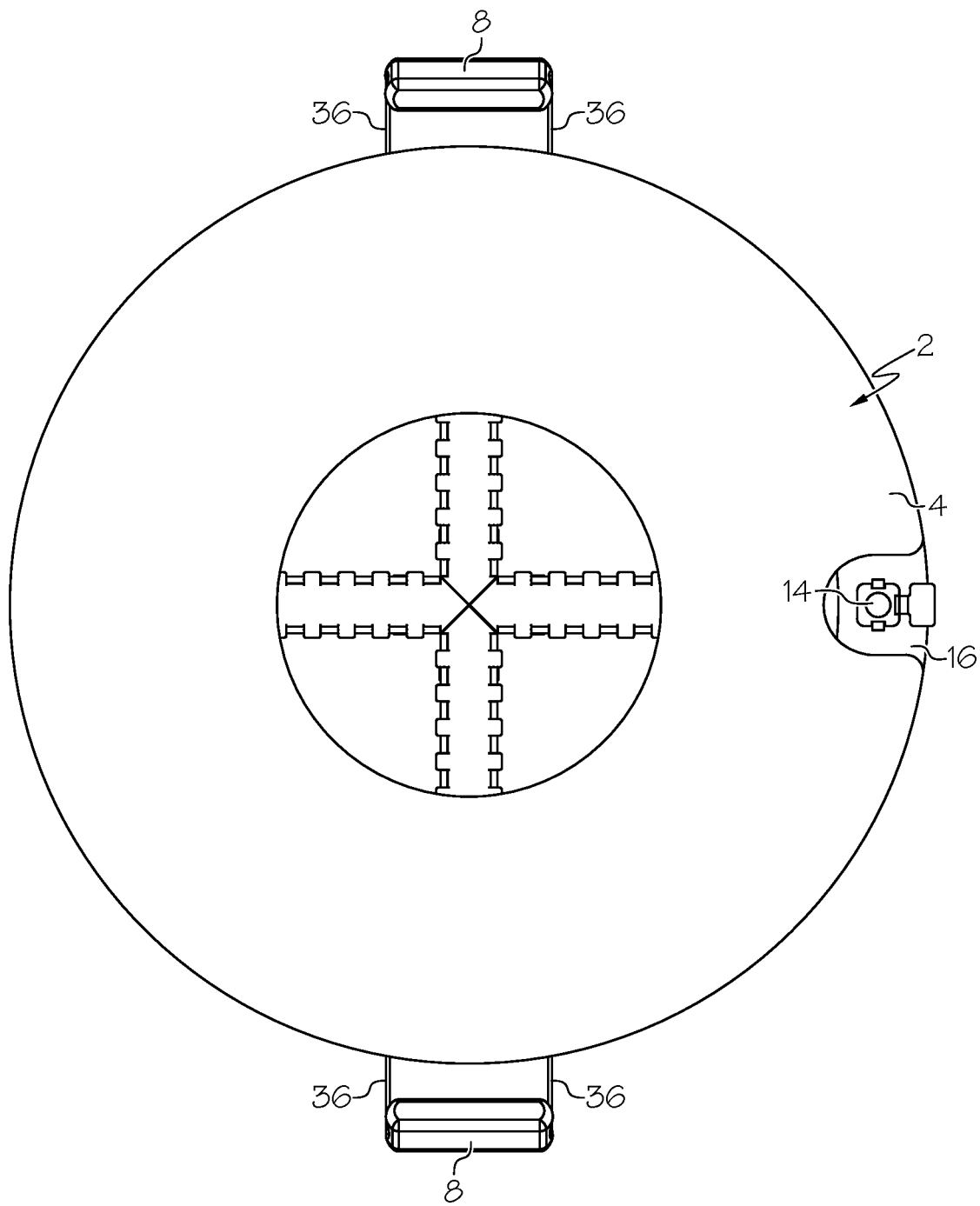
FIG. 2 is a top plan view of FIG. 1.
Figure 3:
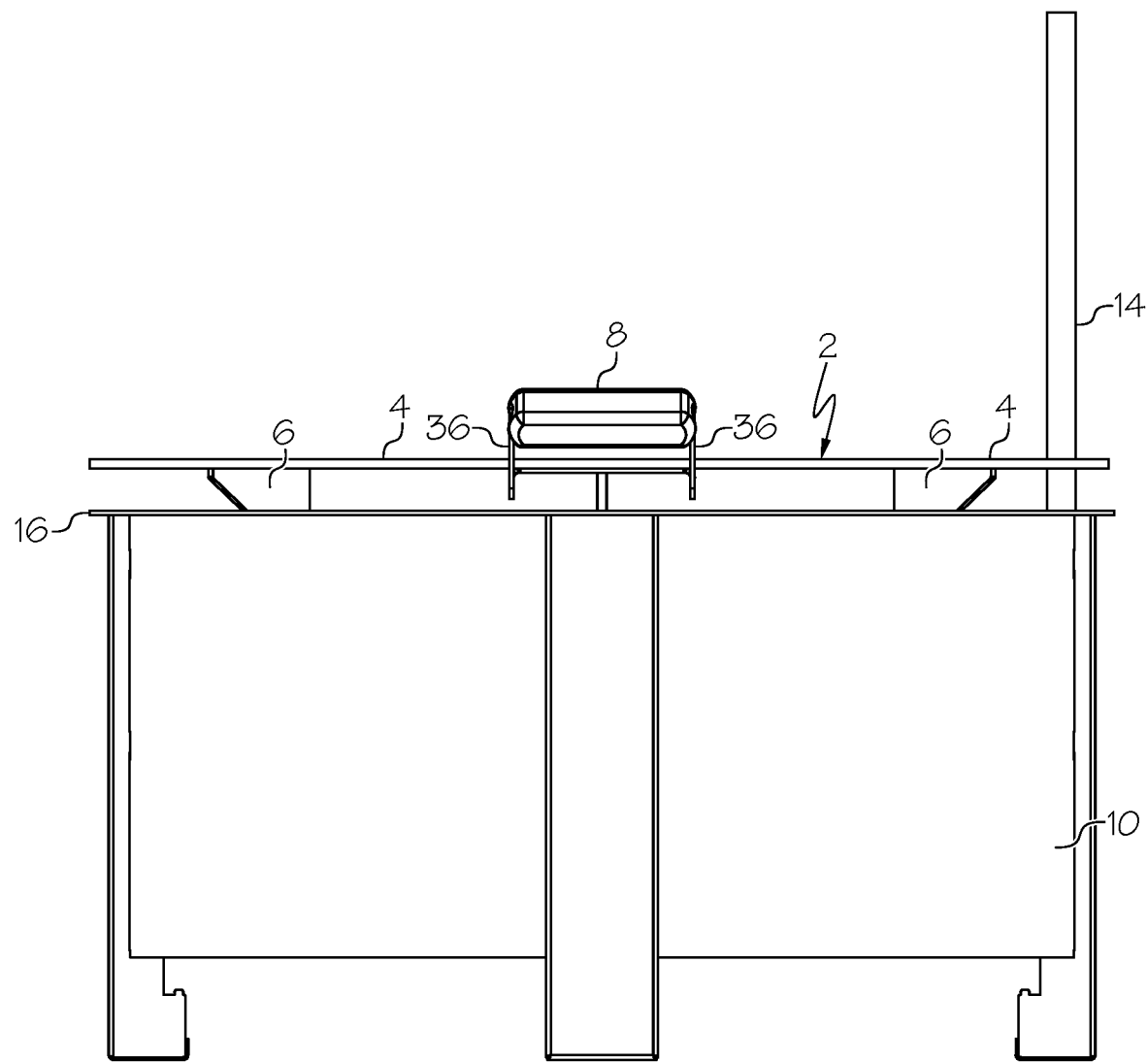
FIG. 3 is a side view of FIG. 1.
Figure 4:
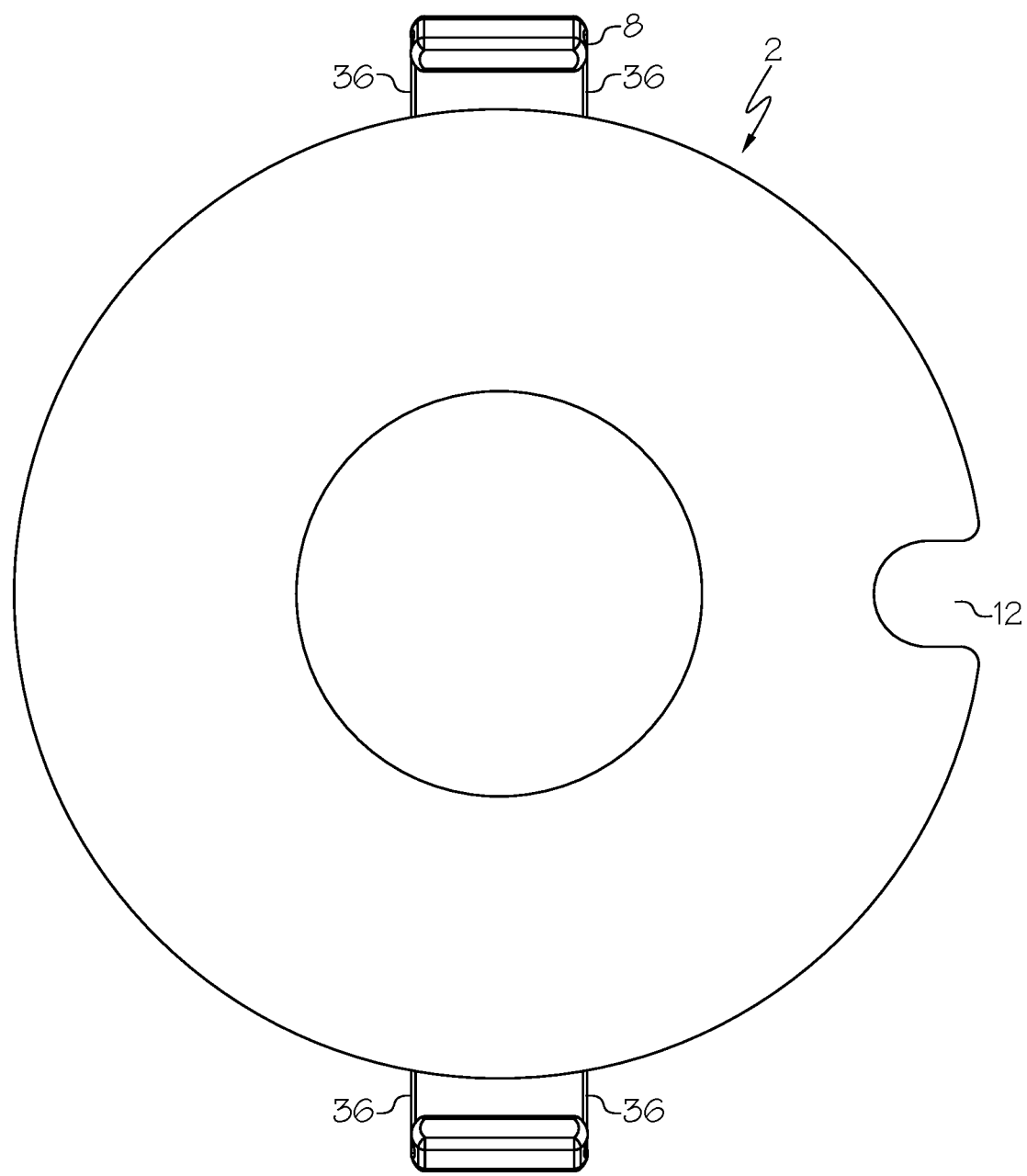
FIG. 4 is a top plan view of the exemplary first configuration of the cooking plate.
Figure 5:
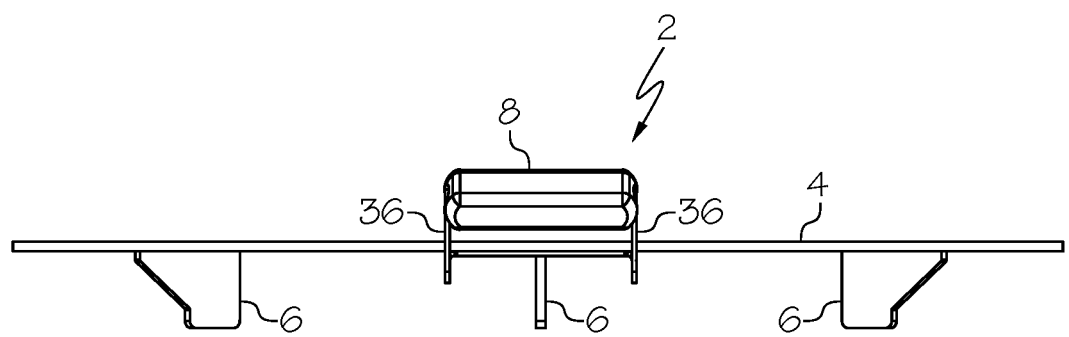
FIG. 5 is a side elevation view of FIG. 4.
Figure 6:
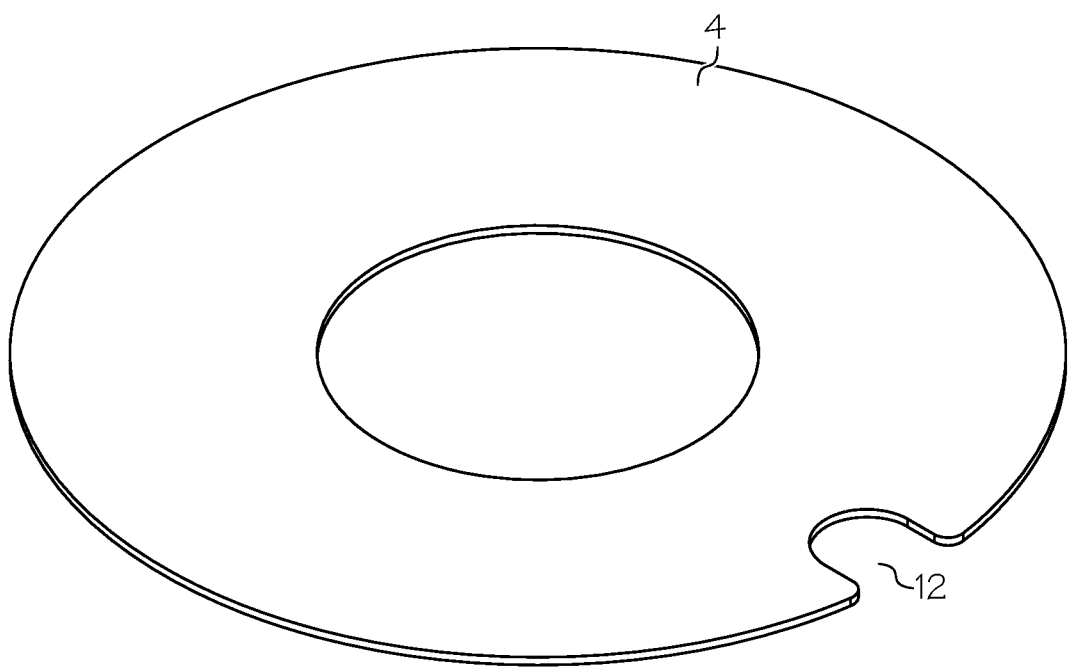
FIG. 6 is a perspective view of the ring-shaped plate of the cooking plate of FIG. 4.
Figure 7:
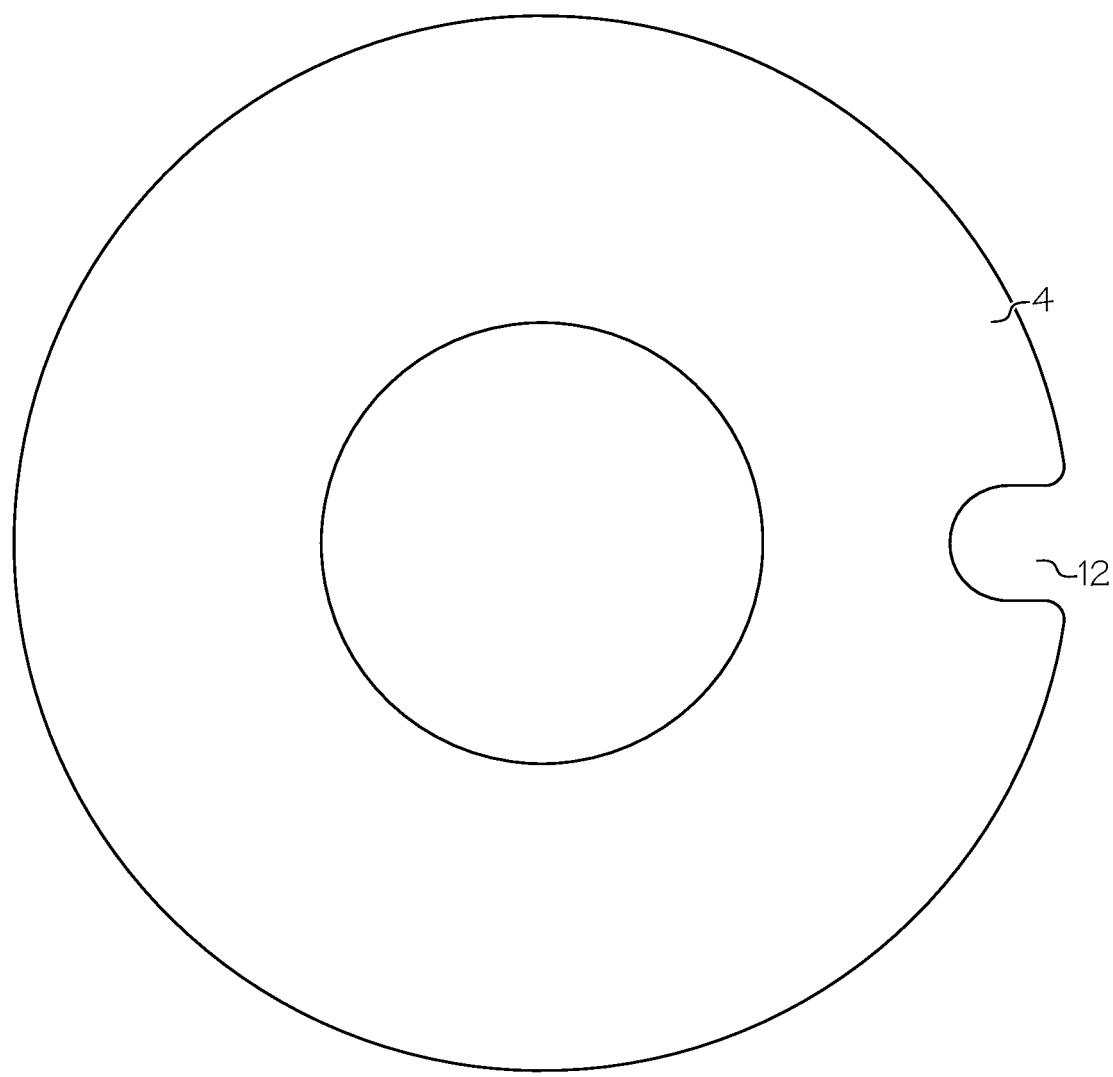
FIG. 7 is a top plan view of FIG. 6.
Figure 8:
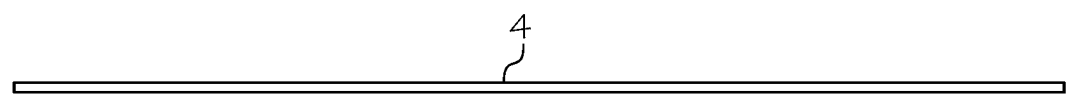
FIG. 8 is a side elevation view of FIG. 6.
Figure 9:
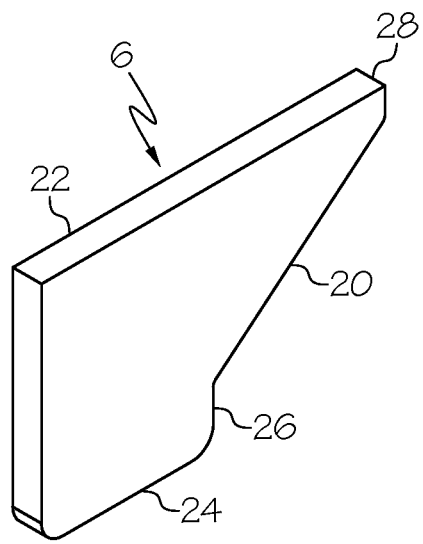
FIG. 9 is a perspective view of a support tab.
Figure 10:
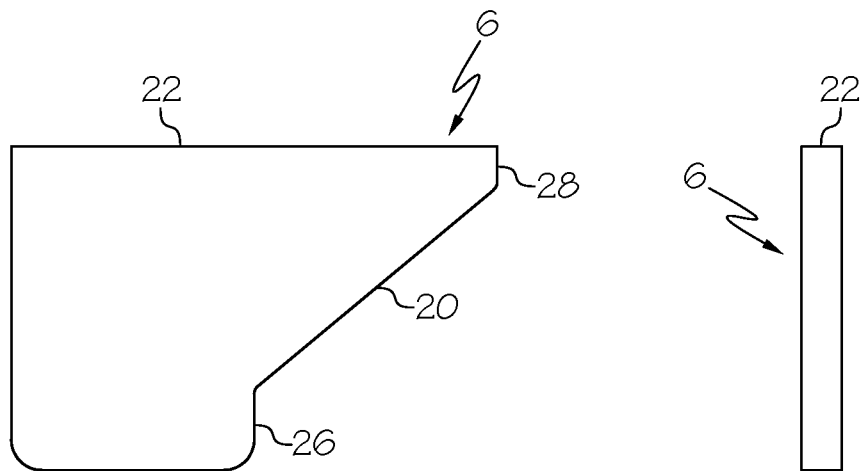
FIG. 10 is a side elevation view of FIG. 9.
Figure 11:
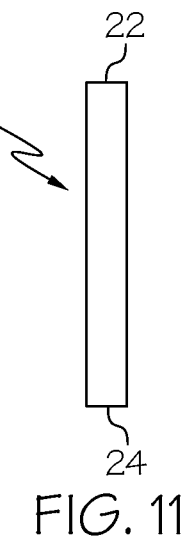
FIG. 11 is an end elevation view of FIG. 9.

A first exemplary configuration of the cooking plate of the disclosure is indicated generally by the reference numeral 2 in FIGS. 1-11. Cooking plate 2 includes a plate 4 and a plurality of support tabs 6. Plate 4 is ring-shaped and defines a central opening that provides access to the fire when cooking plate 2 is being used. In the exemplary configuration, three support tabs 6 are evenly spaced at 120 degrees about plate 4. Plate 4 and support tabs 6 are made from quarter inch thick carbon steel and welded together. Cooking plate 2 also may include handles 8. When handles 8 are provided, they are connected to the lower surface of plate 4 with spaced legs 36 so that they do not interfere with the upper cooking surface. Legs 36 position the grips of handles 8 above plate 4.

In the first exemplary configuration, plate 4 is ring-shaped with a circular inner edge and a circular outer edge. Plate 4 defines a central opening with a diameter of 11.5 inches with its outer diameter of 27.5 inches. These dimensions are exemplary for cooking plate 2 that is used with a twenty-four inch diameter fire pit 10 and locates the outer edge of plate 4 above the outer edge of fire pit 10. When configured for larger or smaller fire pits, the dimensions change accordingly. Plate 4 also defines a concave post indentation 12 that accommodates an accessory post 14.

Fire pit 10 generally includes a fire box that receives the fuel that is burned when fire pit 10 is in use. Fire pit 10 also includes an upper ring-shaped flange 16 that is disposed about the top of fire pit 10. Flange 16 has an inner radius. Cooking plate 2 is carried by the inner edge of upper flange 16 with the lower surface of plate 4 spaced above the upper surface of upper flange 16. This provides for even heating of plate 4 and allows air to flow between plate 4 and upper flange 16. The exemplary configuration of fire pit 10 has air flow channels at its sidewalls that bring air up from the bottom of fire pit 10 and deliver the air to the top of the fire box. Cooking plate 2 can be used with fire pits that do not include these air flow channels. Cooking plate 2 also can be placed directly on the upper surface of the sidewall of fire pit 10 when fire pit 10 does not have flange 16.

Plate 4 is supported by support tabs 6 in a manner that allows plate 4 to be leveled with respect to fire pit 10. Each tab 6 includes an angled support edge 20 that rests against the inner edge of upper flange 16 or the upper surface of the sidewall. The angled support edges 20 face outwardly away from the center of plate 4. Tabs 6 can be located along radii of plate 4. Cooking plate 2 is placed down onto upper flange with all of support tabs 6 contacting the inner edge of upper flange 16 or the upper surface of the sidewall. The user can then adjust cooking plate 2 until plate 4 is level for cooking. The center of each angled support edge 20 is spaced from the center of plate 4 the same distance as the radius of the inner edge of ring-shaped flange 16 or the same distance as the radius of the upper inner surface of the sidewall.

Each support tab 6 has an upper edge 22 that is longer than its lower edge 24. Angled support edge 20 is arranged at an angle between zero and ninety with respect to upper edge 22 with an angle between thirty and sixty degrees being used in this configuration. Each support tab 6 also defines a vertical stop wall 26 that extends between the outer end of lower edge 24 and the lower end of angled support edge 20. These stop walls 26 limit the movement of cooking plate 2 when the user is adjusting it for level by engaging the inner edge of upper flange 16 when an angled support edge 20 is slid to its outer limit.

Each support tab 6 also has a vertical outer edge 28 that is disposed between the outer end of upper edge 22 and the upper end of angled support edge 20. Vertical outer edge 28 functions to inform the user when cooking plate 2 has been adjusted to a position where an angled support surface of support 6 is no longer engaging the inner edge of upper flange 16.

A user can start a fire in fire pit 10 and allow it to reach a desired cooking temperature. Cooking plate 2 can be added after the fire is hot or after the fire is started. The user lowers cooking plate 2 onto upper flange 16 and then slides it back and forth until level. Handles 8 are spaced above flange 16 to limit heat transfer to handles 8. The user can then let plate 4 come up to temperature and cook food directly on plate 4. Cooking plate 2 can be used in combination with a grill supported on post 14 above the fire box. When cooking is complete, cooking plate 2 can be removed and set aside to cool while the fire continues to burn.

Figure 12:
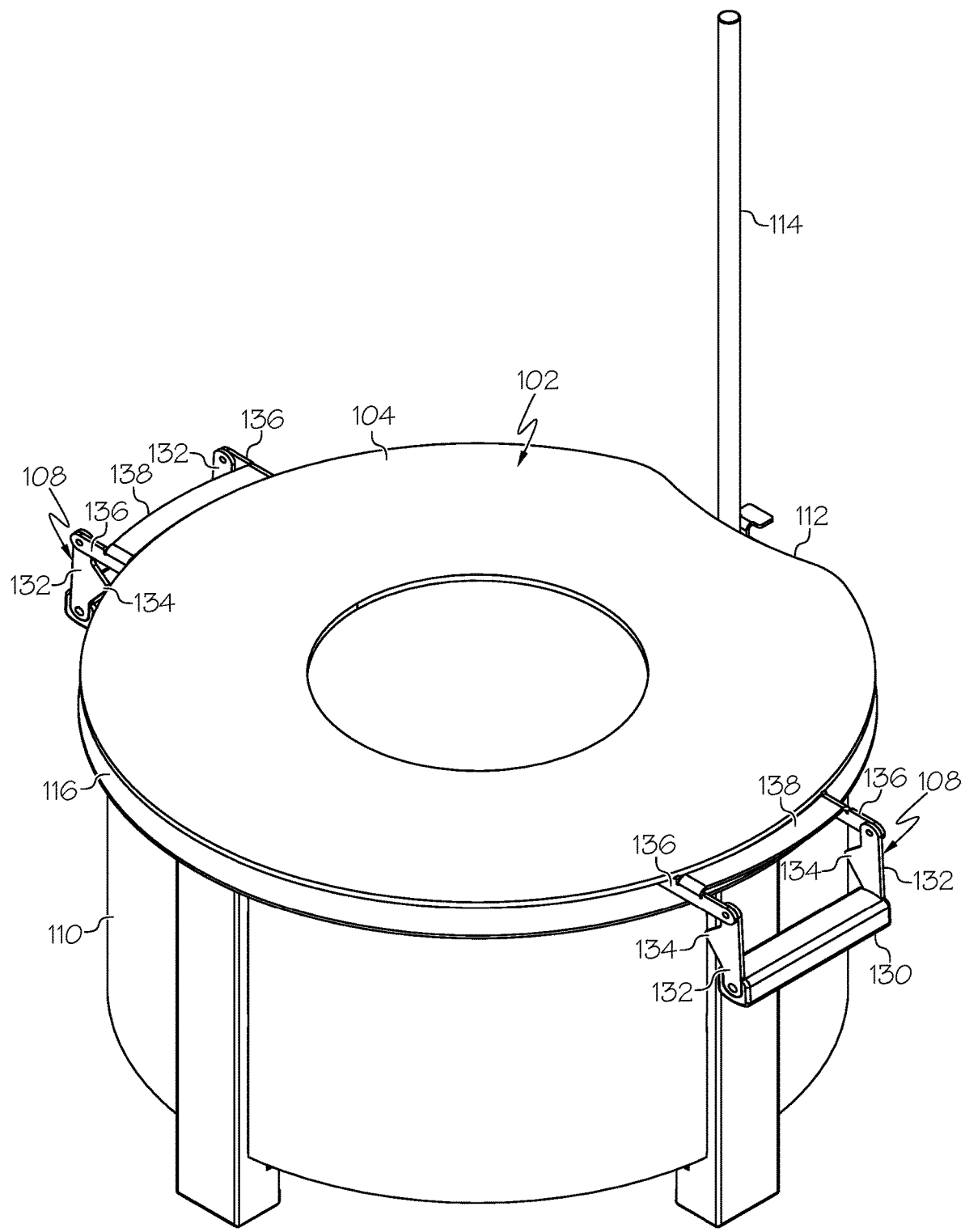
FIG. 12 is a perspective view of a second configuration of a cooking plate connected to a fire pit having an accessory post.
Figure 13:
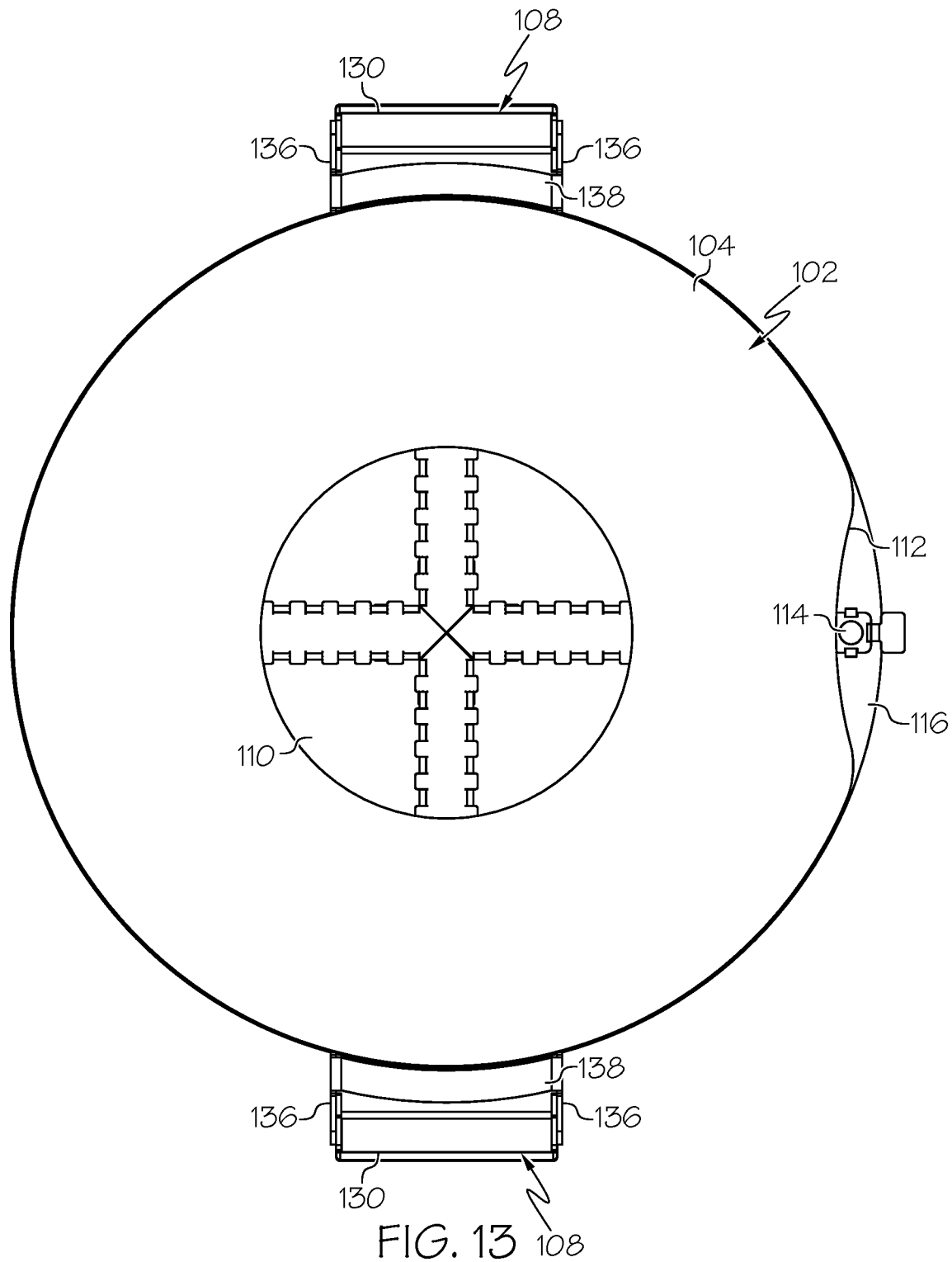
FIG. 13 is a top plan view of FIG. 12.
Figure 14:
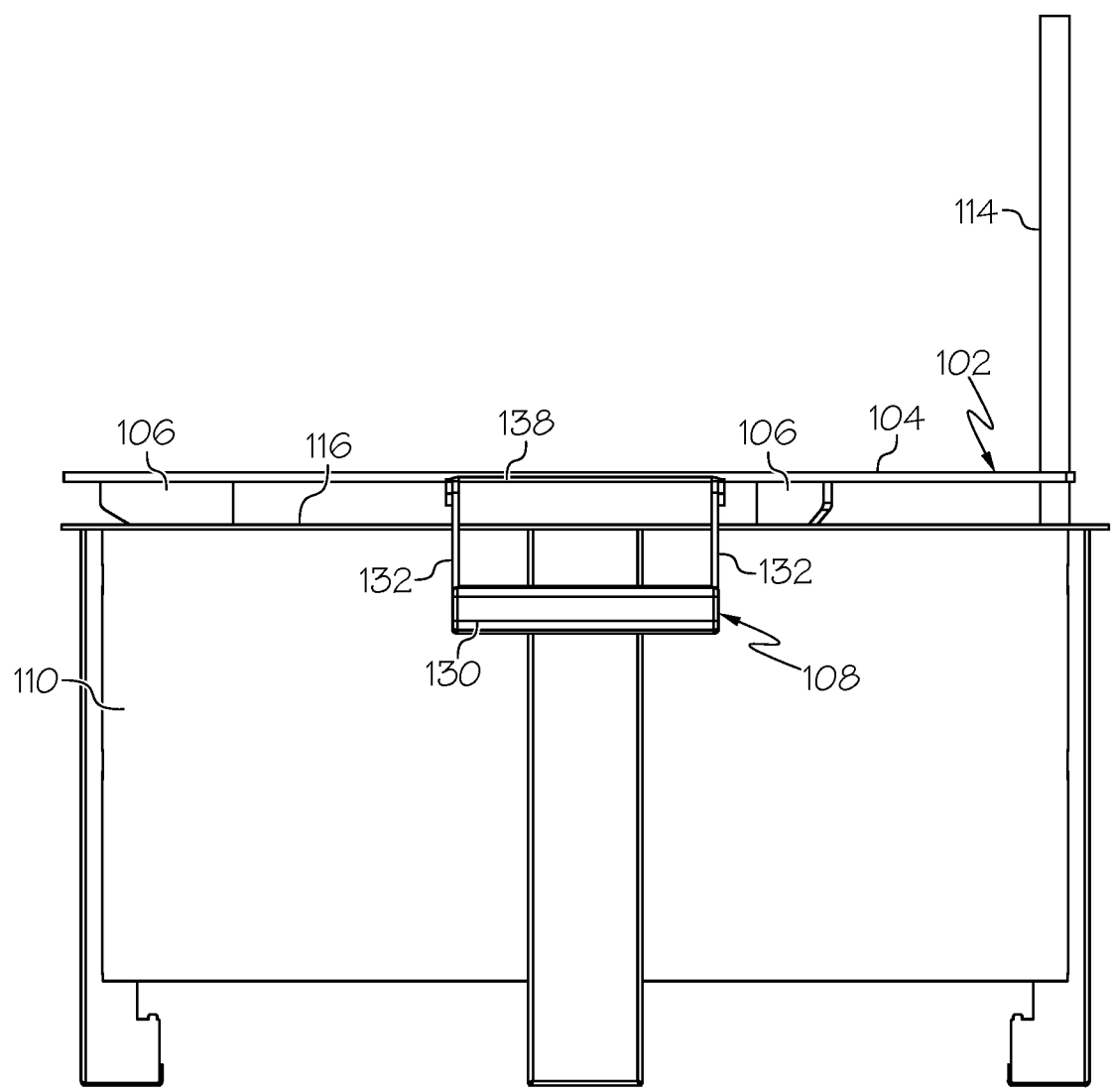
FIG. 14 is a side view of FIG. 12.
Figure 15:
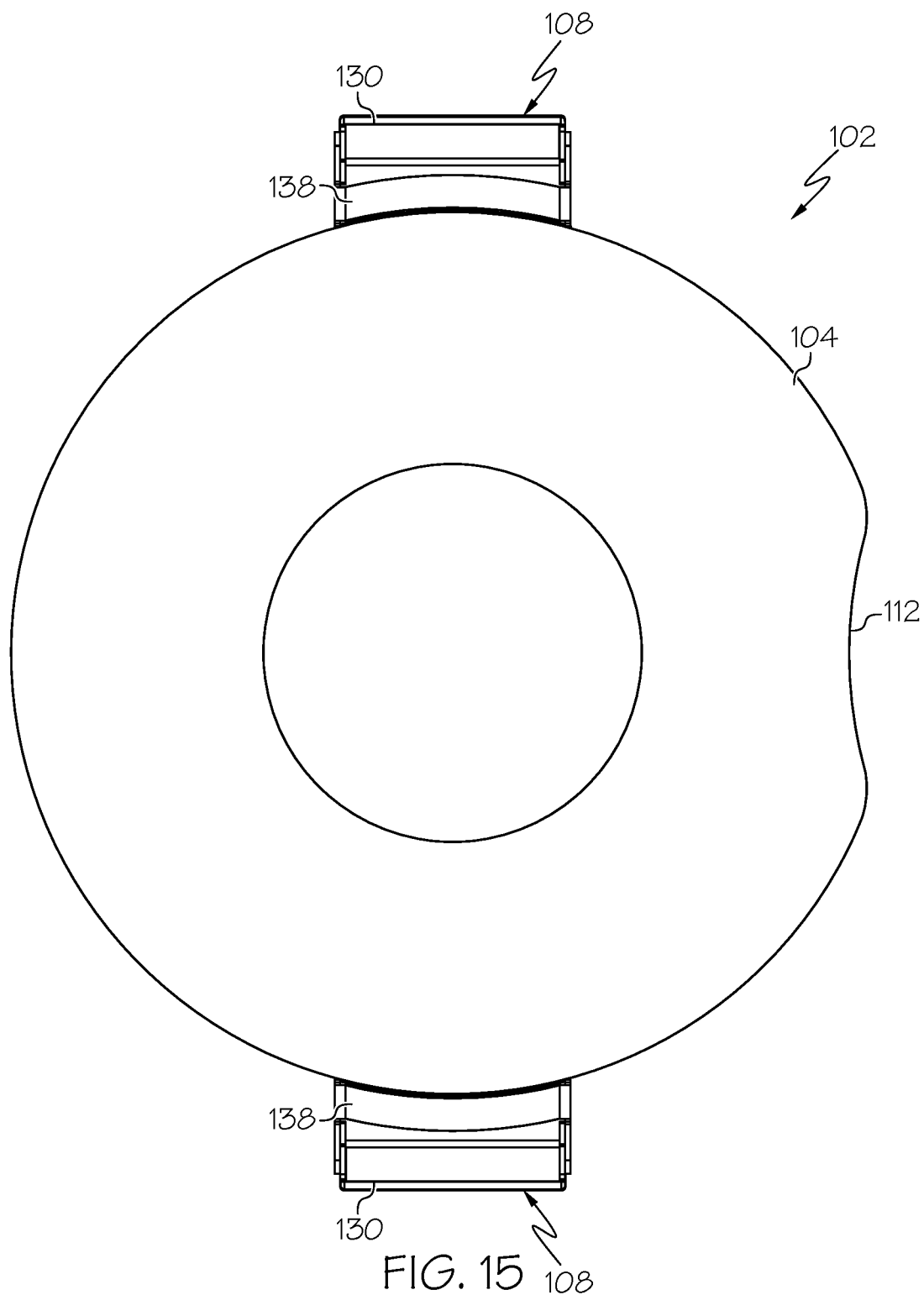
FIG. 15 is a top plan view of the exemplary second configuration of the cooking plate.
Figure 16:
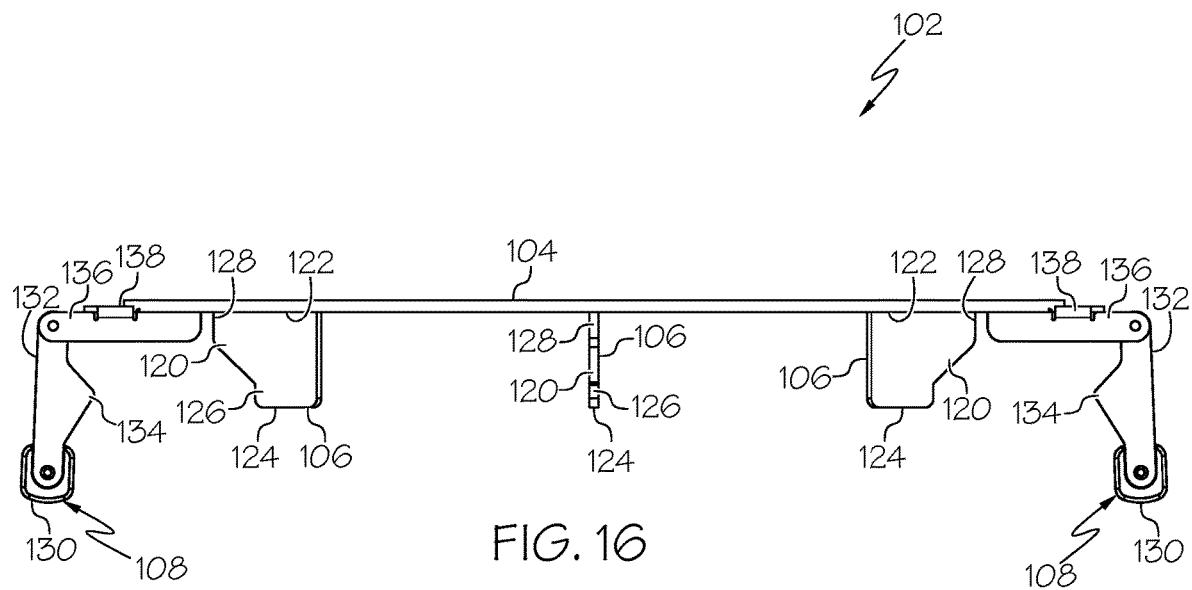
FIG. 16 is a side elevation of FIG. 15.

A second exemplary configuration of the cooking plate of the disclosure is indicated generally by the reference numeral 102 in FIGS. 12-16. Cooking plate 102 includes a plate 104 and a plurality of support tabs 106. Plate 104 is ring-shaped and defines a central opening that provides access to the fire when cooking plate 102 is being used. In the exemplary configuration, three support tabs 106 are evenly spaced at 120 degrees about plate 104. Plate 104 is made from quarter inch thick carbon steel and tabs 106 are made from 0.19 inch (6 or 7 gauge) stainless steel and the parts are welded together. Cooking plate 102 also may include handles 108. When handles 108 are provided, they are connected to the lower surface of plate 104 with spaced legs so that they do not interfere with the upper cooking surface.

In the second exemplary configuration, plate 104 is ring-shaped with a circular inner edge and a generally circular outer edge. Plate 104 defines a central opening with a diameter of 8.41 inches with its outer diameter of 19.63 inches. These dimensions are exemplary for cooking plate 102 that is used with a nineteen inch diameter fire pit 110 and locates the outer edge of plate 104 roughly above the outer edge of fire pit 110. When configured for larger or smaller fire pits, the dimensions change accordingly. Plate 104 also defines a concave post indentation 112 that accommodates an accessory post 114.

Fire pit 110 generally includes a fire box that receives the fuel that is burned when fire pit 110 is in use. Fire pit 110 also includes an upper ring-shaped flange 116 that is disposed about the top of fire pit 110. Flange 116 has an inner radius. Cooking plate 102 is carried by the inner edge of upper flange 116 with the lower surface of plate 104 spaced above the upper surface of upper flange 116. This provides for even heating of plate 104 and allows air to flow between plate 104 and upper flange 116. The exemplary configuration of fire pit 110 has air flow channels at its sidewalls that bring air up from the bottom of fire pit 110 and deliver the air to the top of the fire box. Cooking plate 102 can be used with fire pits that do not include these air flow channels. Cooking plate 102 also can be placed directly on the upper surface of the sidewall of fire pit 110 when fire pit 110 does not have flange 116.

Plate 104 is supported by support tabs 106 in a manner that allows plate 104 to be leveled with respect to fire pit 110. Each tab 106 includes an angled support edge 120 that rests against the inner edge of upper flange 116 or the upper surface of the sidewall. The angled support edges 120 face outwardly. The angled support edges 120 face outwardly away from the center of plate 104. Tabs 106 can be located along radii of plate 104. Cooking plate 102 is placed down onto upper flange with all of support tabs 106 contacting the inner edge of upper flange 116 or the upper surface of the sidewall. The user can then adjust cooking plate 102 until plate 104 is level for cooking. The center of each angled support edge 120 is spaced from the center of plate 104 the same distance as the radius of the inner edge of ring-shaped flange 116 or the same distance as the radius of the upper inner surface of the sidewall.

Each support tab 106 has an upper edge 122 that is longer than its lower edge 124. Angled support edge 120 is arranged at an angle between zero and ninety with respect to upper edge 122 with an angle between thirty and sixty degrees being used in this configuration. Each support tab 106 also defines a vertical stop wall 126 that extends between the outer end of lower edge 124 and the lower end of angled support edge 120. These stop walls 126 limit the movement of cooking plate 102 when the user is adjusting it for level by engaging the inner edge of upper flange 116 when an angled support edge 120 is slid to its outer limit.

Each support tab 106 also has a vertical outer edge 128 that is disposed between the outer end of upper edge 122 and the upper end of angled support edge 120. Vertical outer edge 128 functions to inform the user when cooking plate 102 has been adjusted to a position where an angled support surface of support 106 is no longer engaging the inner edge of upper flange 116.

A user can start a fire in fire pit 110 and allow it to reach a desired cooking temperature. Cooking plate 102 can be added after the fire is hot or after the fire is started. The user lowers cooking plate 102 onto upper flange 116 and then slides it back and forth until level. Handles 108 are spaced above flange 116 to limit heat transfer to handles 108. The user can then let plate 104 come up to temperature and cook food directly on plate 104. Cooking plate 102 can be used in combination with a grill supported on post 114 above the fire box. When cooking is complete, cooking plate 102 can be removed and set aside to cool while the fire continues to burn.

In the second embodiment, each handle 108 includes a U-shaped grip assembly that includes a grip 130 carried between two grip arms 132. Grip 130 can rotate about its longitudinal axis with respect to grip arms 132. Each grip arm 132 includes an inwardly or downwardly protruding spacer 134 that, in some situations, spaces grip 130 from fire pit 110 when cooking plate 102 is placed on fire pit 110. In some cases when flange 116 has a larger diameter than plate 104, spacers 134 engage flange 116 to keep grips 130 spaced above or above and outwardly of flange 116. In other cases, spacers 134 engage the outer surface of the fire pit sidewall or the legs of fire pit 110 to space grips 130 from fire pit 110. Spacing grips 130 from fire pit 110 helps keeps them cool while cooking plate 102 is in use. In this configuration, spacers 134 are generally triangular in shape to provide a small contact point with fire pit 110 or flange 116 to limit heat transfer. In other configurations, spacers 134 are thin protruding posts.

The U-shaped grip assembly is pivotably connected to a grip base. The grip base includes at least two grip legs 136. Each grip arm 132 is pivotably connected to one grip leg 136 that is connected to the lower surface of plate 104. Grip arms 132 can pivot down to a resting position where grips 130 are below plate 104 and, when being used to lift cooking plate 102, pivot up to where grips 130 are above plate 104. A support 138 extends between grip legs 136. Support 138 can have an inner edge that is curved to match the outer diameter of plate 104 so that support 138 can be welded to plate 104.

Figure 17:
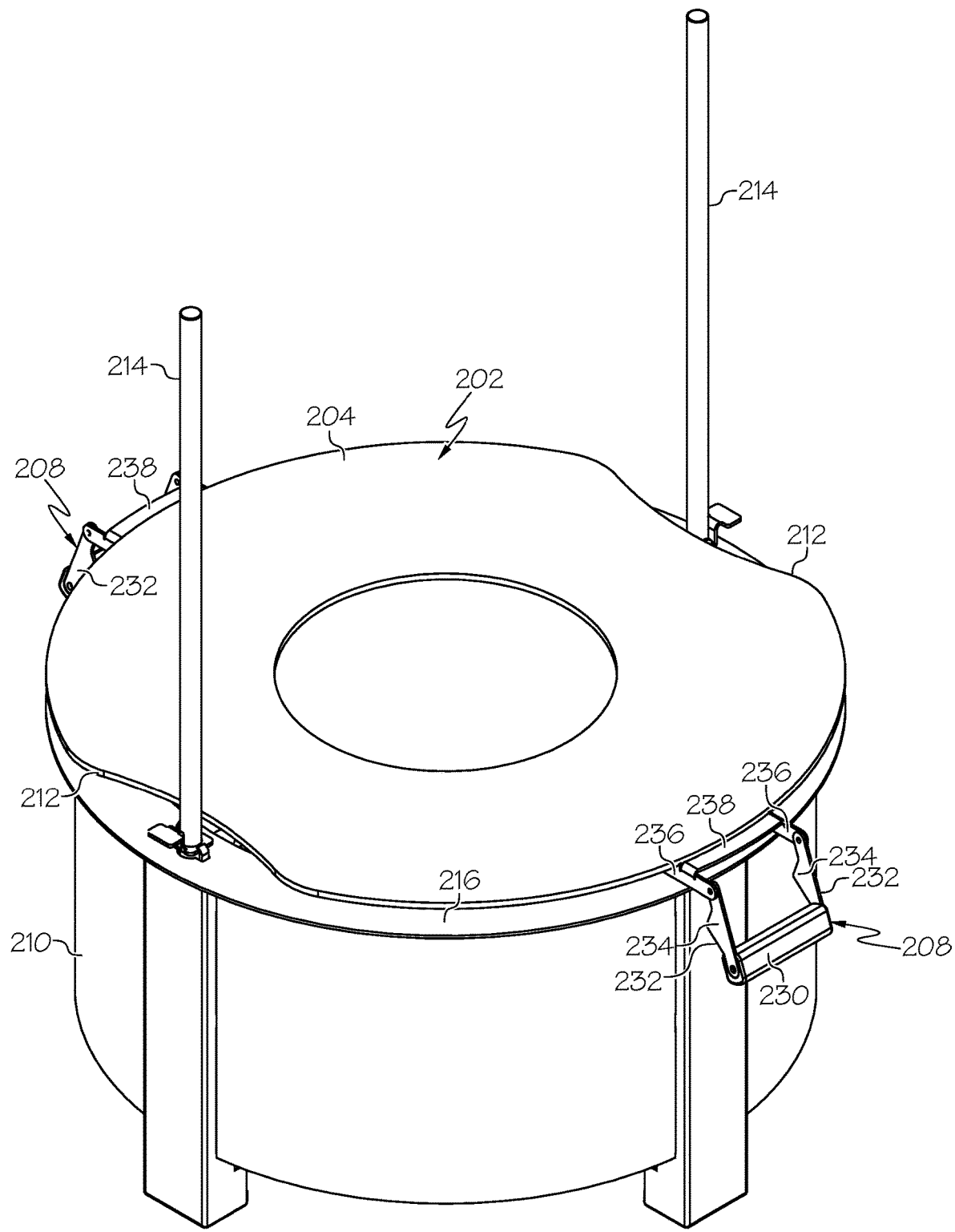
FIG. 17 is a perspective view of a third configuration of a cooking plate connected to a fire pit having two accessory posts.
Figure 18:
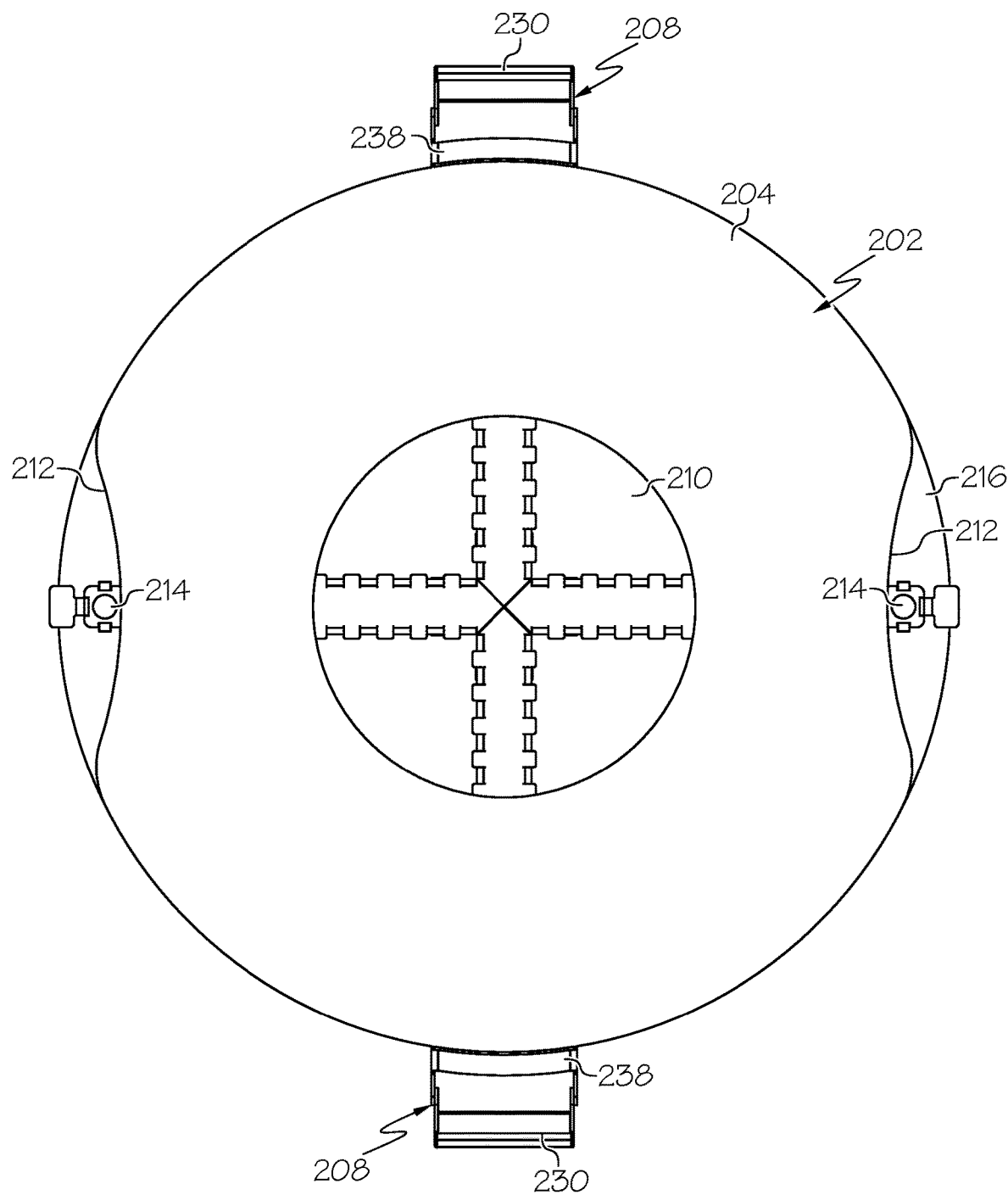
FIG. 18 is a top plan view of FIG. 17.
Figure 19:
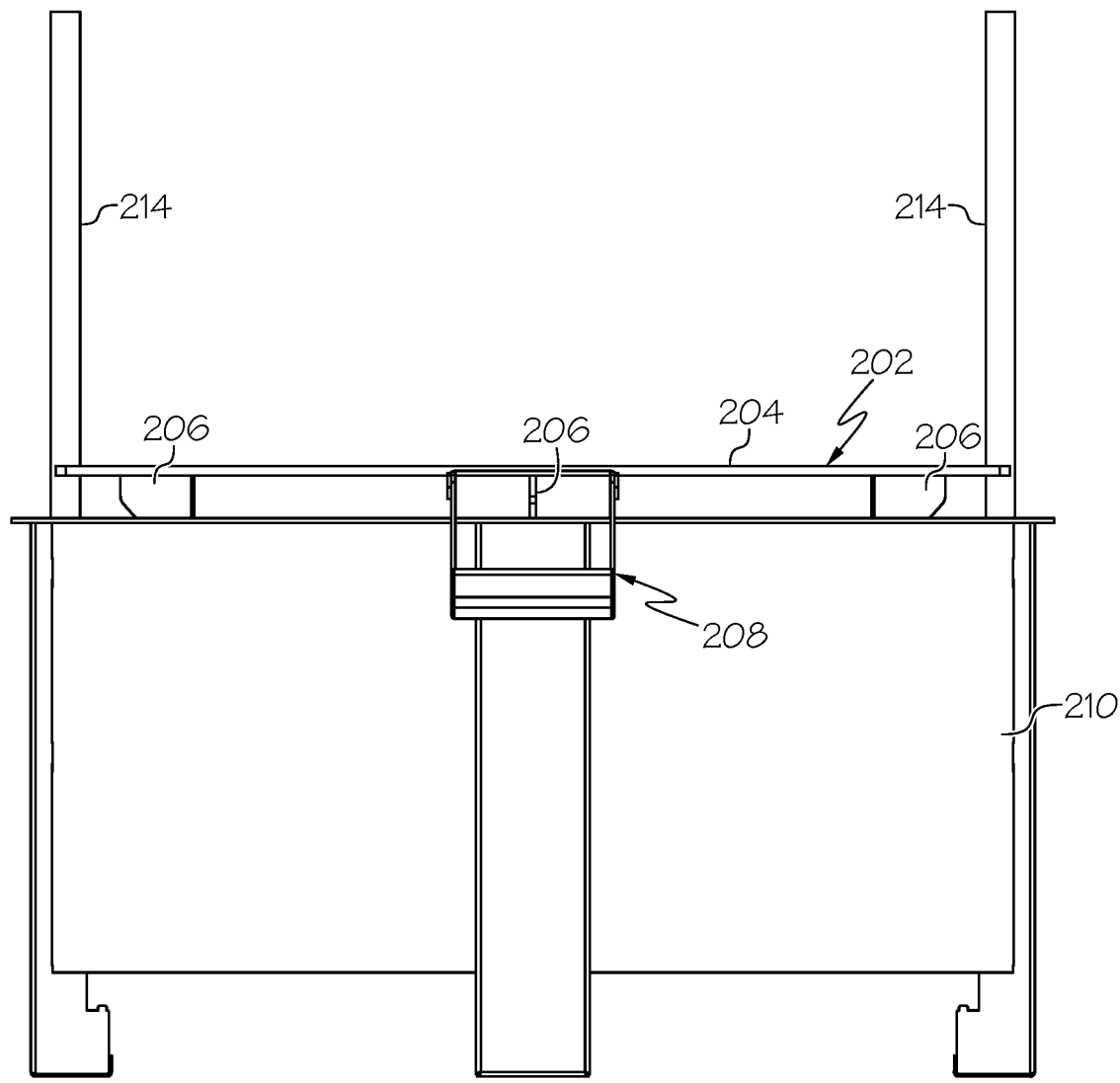
FIG. 19 is a side view of FIG. 17.
Figure 20:
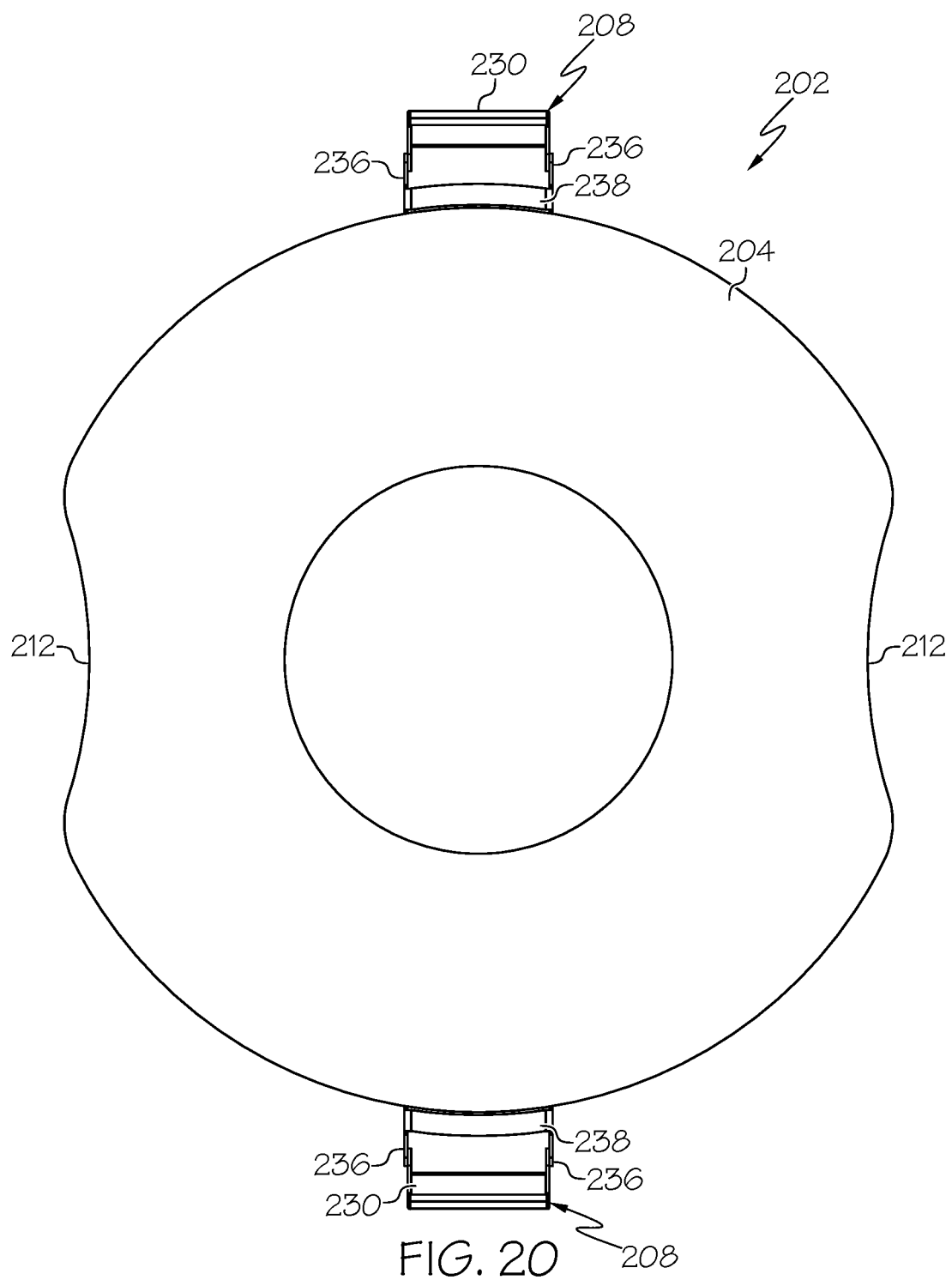
FIG. 20 is a top plan view of the exemplary third configuration of the cooking plate.
Figure 21:
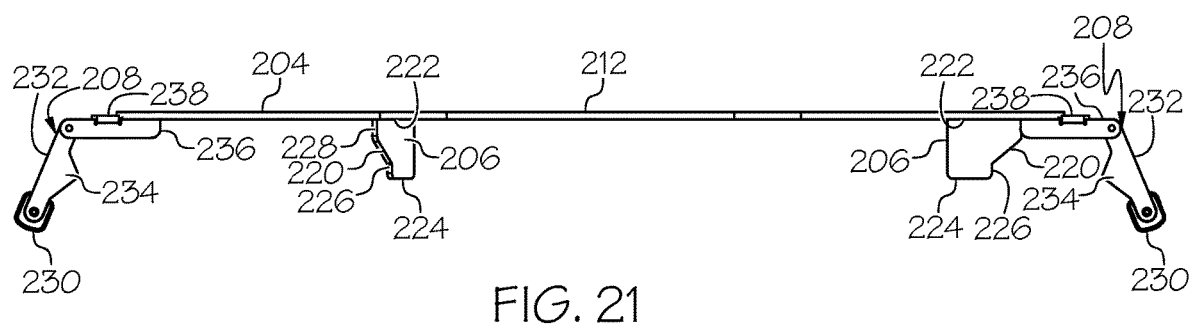
FIG. 21 is a side elevation of FIG. 20.

A third exemplary configuration of the cooking plate of the disclosure is indicated generally by the reference numeral 202 in FIGS. 17-21. Cooking plate 202 includes a plate 204 and a plurality of support tabs 206. Plate 204 is ring-shaped and defines a central opening that provides access to the fire when cooking plate 202 is being used. In the exemplary configuration, three support tabs 206 are evenly spaced at 120 degrees about plate 204. Plate 204 is made from quarter inch thick carbon steel and tabs 206 are made from 0.19 inch (6 guage) stainless steel and the parts are welded together. Cooking plate 202 also may include handles 208. When handles 208 are provided, they are connected to the lower surface of plate 204 with spaced legs so that they do not interfere with the upper cooking surface.

In the third exemplary configuration, plate 204 is ring-shaped with a circular inner edge and a generally circular outer edge. Plate 204 defines a central opening with a diameter of 13.71 inches with its outer diameter of 32.00 inches. These dimensions are exemplary for cooking plate 202 that is used with a thirty inch diameter fire pit 210 and locates the outer edge of plate 204 roughly above the outer edge of fire pit 210. When configured for larger or smaller fire pits, the dimensions change accordingly. Plate 204 also defines a pair of oppositely-disposed concave post indentations 212 that accommodates two accessory posts 214.

Fire pit 210 generally includes a fire box that receives the fuel that is burned when fire pit 210 is in use. Fire pit 210 also includes an upper ring-shaped flange 216 that is disposed about the top of fire pit 210. Flange 216 has an inner radius. Cooking plate 202 is carried by the inner edge of upper flange 216 with the lower surface of plate 204 spaced above the upper surface of upper flange 216. This provides for even heating of plate 204 and allows air to flow between plate 204 and upper flange 216. The exemplary configuration of fire pit 210 has air flow channels at its sidewalls that bring air up from the bottom of fire pit 210 and deliver the air to the top of the fire box. Cooking plate 202 can be used with fire pits that do not include these air flow channels. Cooking plate 202 also can be placed directly on the upper surface of the sidewall of fire pit 210 when fire pit 210 does not have flange 216.

Plate 204 is supported by support tabs 206 in a manner that allows plate 204 to be leveled with respect to fire pit 210. Each tab 206 includes an angled support edge 220 that rests against the inner edge of upper flange 216 or the upper surface of the sidewall. The angled support edges 220 face outwardly. The angled support edges 220 face outwardly away from the center of plate 204. Tabs 206 can be located along radii of plate 204. Cooking plate 202 is placed down onto upper flange with all of support tabs 206 contacting the inner edge of upper flange 216 or the upper surface of the sidewall. The user can then adjust cooking plate 202 until plate 204 is level for cooking. The center of each angled support edge 220 is spaced from the center of plate 204 the same distance as the radius of the inner edge of ring-shaped flange 216 or the same distance as the radius of the upper inner surface of the sidewall.

Each support tab 206 has an upper edge 222 that is longer than its lower edge 224. Angled support edge 220 is arranged at an angle between zero and ninety with respect to upper edge 222 with an angle between thirty and sixty degrees being used in this configuration. Each support tab 206 also defines a vertical stop wall 226 that extends between the outer end of lower edge 224 and the lower end of angled support edge 220. These stop walls 226 limit the movement of cooking plate 202 when the user is adjusting it for level by engaging the inner edge of upper flange 216 when an angled support edge 220 is slid to its outer limit.

Each support tab 206 also has a vertical outer edge 228 that is disposed between the outer end of upper edge 222 and the upper end of angled support edge 220. Vertical outer edge 228 functions to inform the user when cooking plate 202 has been adjusted to a position where an angled support surface of support 206 is no longer engaging the inner edge of upper flange 216.

A user can start a fire in fire pit 210 and allow it to reach a desired cooking temperature. Cooking plate 202 can be added after the fire is hot or after the fire is started. The user lowers cooking plate 202 onto upper flange 216 and then slides it back and forth until level. Handles 208 are spaced above flange 216 to limit heat transfer to handles 208. The user can then let plate 204 come up to temperature and cook food directly on plate 204. Cooking plate 202 can be used in combination with a grill supported on post 214 above the fire box. When cooking is complete, cooking plate 202 can be removed and set aside to cool while the fire continues to burn.

In the third embodiment, each handle 208 includes a U-shaped grip assembly that includes a grip 230 carried between two grip arms 232. Grip 230 can rotate about its longitudinal axis with respect to grip arms 232. Each grip arm 232 includes an inwardly or downwardly protruding spacer 234 that, in some situations, spaces grip 230 from fire pit 210 when cooking plate 202 is placed on fire pit 210. In some cases when flange 216 has a larger diameter than plate 204, spacers 234 engage flange 216 to keep grips 230 spaced above or above and outwardly of flange 216. In other cases, spacers 234 engage the outer surface of the fire pit sidewall or the legs of fire pit 210 to space grips 230 from fire pit 210. Spacing grips 230 from fire pit 210 helps keeps them cool while cooking plate 202 is in use. In this configuration, spacers 234 are generally triangular in shape to provide a small contact point with fire pit 210 or flange 216 to limit heat transfer. In other configurations, spacers 234 are thin protruding posts.

The U-shaped grip assembly is pivotably connected to a grip base. The grip base includes at least two grip legs 236. Each grip arm 232 is pivotably connected to one grip leg 236 that is connected to the lower surface of plate 204. Grip arms 232 can pivot down to a resting position where grips 230 are below plate 204 and, when being used to lift cooking plate 202, pivot up to where grips 230 are above plate 204. A support 238 extends between grip legs 236. Support 238 can have an inner edge that is curved to match the outer diameter of plate 204 so that support 238 can be welded to plate 204.

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the description and illustration of the invention is an example and the invention is not limited to the exact details shown or described. Modifications and alterations of those embodiments will be apparent to one who reads and understands this general description. The present disclosure should be construed as including all such modifications and alterations insofar as they come within the scope of the appended claims or equivalents thereof. Throughout the description and claims of this specification the words "comprise" and "include" as well as variations of those words, such as "comprises," "includes," "comprising," and "including" are not intended to exclude additives, components, integers, or steps.

The invention claimed is:

1. A cooking plate for a fire pit that has an upper ring-shaped flange at a top of a fire box; the upper ring-shaped flange having an inner edge; the cooking plate comprising:
    a plate on which food is to be cooked;
    a plurality of tabs connected to the plate; the tabs being adapted to engage the inner edge of the upper ring-shaped flange of the fire pit to space the plate above the upper ring-shaped flange of the fire pit;
    each tab including an angled support edge adapted to engage the inner edge of the upper ring-shaped flange;
    each angled support edge being oriented at an angle between thirty and sixty degrees with respect to a lower surface of the plate; and
    each tab being positioned with the angled support edge facing outwardly with respect to the plate such that the angle of the plate with respect to the upper ring-shaped flange can be adjusted.

2. The cooking plate of claim 1, further comprising a plurality of handles connected to the plate.

3. The cooking plate of claim 2, wherein the handles and tabs are connected to the lower surface of the plate.

4. The cooking plate of claim 3, wherein the plate is ring-shaped and defines a central opening.

5. The cooking plate of claim 1, wherein each tab includes a lower edge having an inner end and an outer end; each angled support edge having a lower end and an upper end; and a stop wall extending between the outer end of the lower edge and the lower end of the angled support edge.

6. The cooking plate of claim 5, wherein each tab includes an upper edge having an inner end and an outer end; the upper edge connected to the plate; and an outer edge extending between the outer end of the upper edge and the upper end of the angled support edge.

7. The cooking plate of claim 6, wherein the stop wall and outer edge are perpendicular to the upper edge.

8. The cooking plate of claim 1, wherein the plate has an outer edge that defines an indentation located between two of the tabs.

9. The cooking plate of claim 1, further comprising a plurality of handles connected to the plate; each of the handles including a grip assembly that pivots with respect to a grip base; the grip base being connected to the plate.

10. The cooking plate of claim 9, wherein the grip assembly includes a spacer.

11. The cooking plate of claim 10, wherein the grip assembly includes two grip arms which are pivotably connected to the grip base; each of the grip arms having an integrated spacer.

12. A cooking plate for a fire pit; the cooking plate comprising:
    a plate on which food is to be cooked;
    a plurality of tabs adapted to engage the fire pit to support the ring-shaped plate above the fire pit; and
    a plurality of handles connected to the plate; each of the handles including a grip assembly that pivots with respect to a grip base; the grip base being connected to and extending outwardly from the plate; wherein the grip assembly includes a projecting spacer adapted to space the grip assembly from the fire pit when the grip assembly is not in use to carry the cooking plate.

13. The cooking plate of claim 12, wherein each tab includes an angled support edge adapted to engage the fire pit; each tab including an upper edge having an inner end and an outer end; the upper edge being connected to the plate; and wherein the angled support edge is angled at an angle between thirty and sixty degrees with respect to the upper edge.

14. The cooking plate of claim 12, wherein the ring-shaped plate has an outer edge that defines an indentation located between two of the tabs.

15. The cooking plate of claim 12, wherein the grip assembly includes two grip arms which are pivotably connected to the grip base; each of the grip arms having an integrated spacer adapted to space the grip assembly from the fire pit.

16. The cooking plate of claim 12, wherein the grip base includes at least first and second grip legs connected to the plate; a support extending between the first and second grip legs.

17. The cooking plate of claim 16, wherein the grip assembly includes first and second grip arms and a grip supported by the first and second arms; the first grip arm being pivotably connected to the first grip leg; the second grip arm being pivotably connected to the second grip leg such that the grip assembly can pivot down to a resting position where the grip is positioned lower than the plate and, when being used to lift the plate, pivot up to where the grip is positioned higher than the plate.

18. The cooking plate of claim 17, wherein each grip arms includes a spacer adapted to space the grip assembly from the fire pit.

19. A cooking plate for a fire pit that has an upper ring-shaped flange at a top of a fire box; the upper ring-shaped flange having an inner edge; the cooking plate comprising:

a plate on which food is to be cooked;

a plurality of tabs connected to the plate; the tabs being adapted to engage the inner edge of the upper ring-shaped flange of the fire pit to space the plate above the upper ring-shaped flange of the fire pit;

each tab including an angled support edge adapted to engage the inner edge of the upper ring-shaped flange;

each angled support edge being oriented at an angle between thirty and sixty degrees with respect to a lower surface of the plate;

each tab being positioned with the angled support edge facing outwardly with respect to the plate such that the angle of the plate with respect to the upper ring-shaped flange can be adjusted;

a plurality of handles connected to the plate; each of the handles including a grip assembly that pivots with respect to a grip base; the grip base being connected to the plate;

the grip base including at least first and second grip legs connected to the plate; a support extending between the first and second grip legs;

the grip assembly including first and second grip arms and a grip supported by the first and second arms; the first grip arm being pivotably connected to the first grip leg; the second grip arm being pivotably connected to the second grip leg such that the grip assembly can pivot down to a resting position where the grip is positioned lower than the plate and, when being used to lift the plate, pivot up to where the grip is positioned higher than the plate; and each grip arms including a spacer adapted to space the grip assembly from the fire pit.

* * * * *